Figure 1:
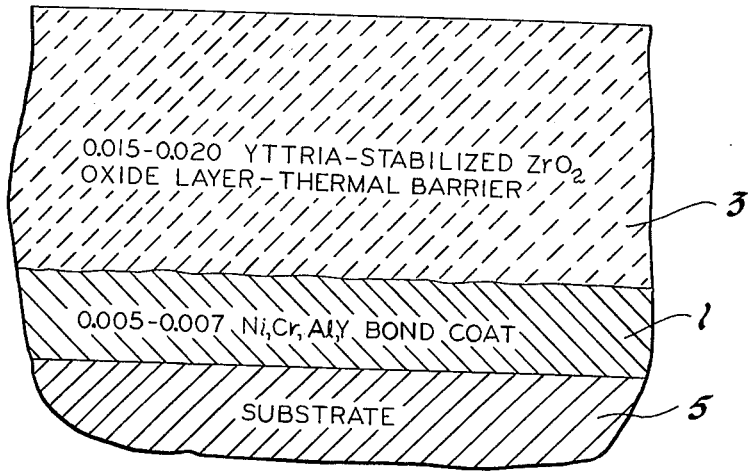

United States Patent [19]
Clingman et al.

[11] 4,269,903
[45] May 26, 1981

[54] ABRADABLE CERAMIC SEAL AND METHOD OF MAKING SAME

[75] Inventors: David L. Clingman, Carmel; John R. Cavanagh, Brownsburg; Berton Schechter, Indianapolis; Kenneth R. Cross, Lebanon, all of Ind.

[73] Assignee: General Motors Corporation, Detroit, Mich.

[21] Appl. No.: 73,550

[22] Filed: Sep. 6, 1979

[51] Int. Cl.³ .............................................. B32B 15/04
[52] U.S. Cl. .................... 428/591; 428/613; 428/623; 428/633; 428/652; 428/472; 428/471
[58] Field of Search .............. 428/633, 652, 667, 472, 428/471, 539, 591, 623, 613; 277/96

[56] References Cited

U.S. PATENT DOCUMENTS

| | | | |
|---|---|---|---|
| 3,092,306 | 6/1963 | Eder | 415/219 R |
| 3,147,087 | 9/1964 | Eisenlohr | 29/191.2 |
| 3,575,427 | 11/1969 | Lapac | 277/96 |
| 3,975,165 | 8/1976 | Elbert | 277/96 |
| 4,055,705 | 10/1977 | Stecura | 428/633 |
| 4,109,031 | 8/1978 | Marscher | 428/472 |

FOREIGN PATENT DOCUMENTS 2460765  10/1975  Fed. Rep. of Germany ........... 428/472

Primary Examiner—Ellis P. Robinson
Attorney, Agent, or Firm—Sidney Carter

[57] ABSTRACT

An abradable ceramic seal coating on at least one of a pair of members having relative rotational movement, the coating being formed of stabilized zirconia which is codeposited with a thermally decomposable organic powder, the codeposited layer being heated to decompose the organic filler and produce a porous coating of from about 20 to about 33% voids.

3 Claims, 2 Drawing Figures

ABRADABLE THERMAL BARRIER COATING

PRIOR ART
THERMAL BARRIER COATING

ABRADABLE THERMAL BARRIER COATING

ABRADABLE CERAMIC SEAL AND METHOD OF MAKING SAME

DESCRIPTION

This invention relates to an abradable ceramic seal coating for a turbomachine in which two cooperating members have relative rotational movement, the coating being deposited on at least one of the members, and to a method for forming such a seal coating. More particularly, the invention relates to a porous ceramic coating or layer which has the desired abradability to enable one of the rotating parts to cut its own clearance in the coating and thus reduce leakage between the two cooperating members.

In turbomachines such as axial flow compressors and turbines, the overall operating efficiency is adversely affected by leakage of the gaseous stream around the tips of the rotating air foils. Since this is a particularly difficult dimension to control due to the need for very close tolerances and clearance under the particularly hostile high temperature, high pressure and high rotating speeds encountered under normal operating conditions, the art has developed the use of abradable sealing coatings. Typically, such coatings are applied, e.g., to the engine stator casing, thus permitting the rotor blades to seat against the stator seal coating with what is essentially zero clearance. Typical of such abradable coatings are the porous metal-thermosetting resin sealing layers disclosed in U.S. Pat. No. 3,092,306 issued June 4, 1963 to V. K. Eder and the resilient rubbery coating having dispersed throughout hollow glass microspheres, U.S. Pat. No. 3,575,427 dated Apr. 20, 1971 issued to E. F. Lapac et al. U.S. Pat. No. 3,147,087 issued Sept. 1, 1964 to A. Eisenlohr discloses an abradable seal coating comprising a low porosity bonding layer with a heterogeneous wear layer of a soft metal matrix such as aluminum containing voids and dispersed graphite or mica. Such standard type coatings have become unsatisfactory as the gas turbine engine art developed to higher operating temperatures, e.g., 1800+° F., this necessitating the use of materials more highly resistant to the high temperatures.

Applicants' invention is based on the use of the ceramic thermal barrier coating system of U.S. Pat. No. 4,055,705 to S. Stecura et al dated Oct. 25, 1977 which is applied to metal surfaces such as turbine blades to provide both low thermal conductivity and improved adherence to the substrate support metal when exposed to high temperature fluids. More particularly, applicants' invention comprises the application of the patented thermal barrier coating system to the engine casing, this thermal barrier system serving as the base for the application of a stabilized zirconia layer which is codeposited with a thermally decomposable organic powder, a porous ceramic seal coating being formed by the application of heat to decompose the organic powder to form the abradable porous ceramic coating.

Since the material of the ceramic porous layer, zirconia, has a melting point of about 4710° F. as against a decomposition temperature of about 1000° F. for an organic filler material such as a polyester powder, it was necessary to develop a method for codepositing these materials of vastly different temperature capability, this having been accommodated by minimizing the residence time of the organic powder in the stream of ceramic material being sprayed from the nozzle of the depositing unit.

It is accordingly an object of our invention to provide a method for forming a porous abradable ceramic layer on a turbomachine component subjected to wear by a cooperating component. It is another object of our invention to provide a method for codepositing a high melting point ceramic material together with an organic filler powder having a relatively low thermal decomposition temperature, the codeposited layer being heated to decompose the organic filler powder and form an abradable porous coating. It is a further object of our invention to provide an abradable porous ceramic layer on a turbomachine member subjected to rubbing contact with a cooperating member.

Figure 2:
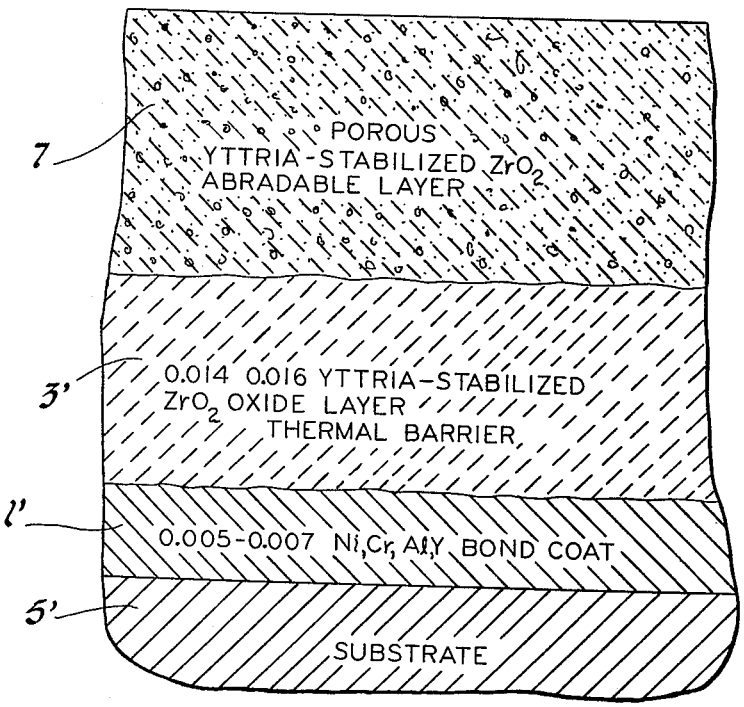

These and other objects of our invention will be apparent from the description which follows and from the drawings in which FIG. 1 is a fragmentary sectional view of a turbomachine casing embodying the thermal barrier coating system of the prior art; and FIG. 2 is a fragmentary sectional view of the controlled porosity ceramic abradable seal coating as applied to the prior art system of FIG. 1.

Our invention is concerned with providing controlled porosity in an otherwise dense ceramic material for the purpose of improving the abradability of the material. This is accomplished by simultaneously codepositing zirconia and stabilizing yttria, or magnesia, or calcium oxide and thermally decomposable organic powder such as polyester powders using the plasma spray process, and in such ratios as are required to produce the desired porosity when the organic powder is subsequently thermally decomposed following deposition of the coating.

While we prefer to use the plasma spray process, it should be appreciated that any other process and equipment well known in the art may be used for receiving a solid material such as a powder or pellets, etc., raising the temperature thereof to soften or melt the material and then project or spray the material outward from the nozzle of the depositing unit toward the surface to be coated, e.g., electric arc and combustion type equipment. Similarly, organic powders which are decomposable thermally may be readily selected from the many available such as other resin powders like the thermoplastic polyamide Upjohn 2080, an amide-imide such as Torlon made by Amoco Chemical Corporation or a phenylene sulphide such as Ryton manufactured by Phillips PetroChemical Corporation.

The primary problem encountered in preparing this coating is caused by the vastly different temperature capabilities and requirements of the two basic materials used in the process. Zirconia, a very high melting point material, about 4710° F., must be heated to a temperature sufficiently high for the particles to soften and deform plastically when deposited on the coating substrate. Conversely, the polyester powder has a very limited temperature capability, about 1000° F. decomposition, and must be prevented from decomposing thermally prior to deposition. Since, in our preferred embodiment, both materials are deposited by the same plasma stream, we have found that the temperature requirements may be accommodated by a different residence time in the plasma for each material. More particularly, the residence time requirements were met by introducing the zirconia powder into the spray gun body while the polyester powder was injected through an external feed port located downstream from the gun spray nozzle. By using the thermal barrier coating system shown in U.S. Pat. No. 4,055,705 with the addition of the porous, low-density, abradable ceramic layer of our invention, all of the benefits derived from the thermal barrier are preserved while attaining the unique feature of our invention, a high temperature seal having abradability for turbine or high temperature compressor blade tip seal applications.

Referring to FIG. 1, the prior art thermal barrier system of U.S. Pat. No. 4,055,705, incorporated by reference, is shown as consisting of a "thin" coating, a bond coat 1 of about 0.005-0.007 inches thick formed of Ni, Cr, Al, Y alloy and an oxide layer 3 of about 0.015-0.020 inches thick applied to a metal substrate surface 5 such as that of a turbine blade.

Since an incursion of turbine blades into a rub track, particularly in small engines, is unlikely to exceed 0.010-0.015 inches without causing considerable damage or seriously affecting performance, the coating system geometry of our invention need only provide for this margin in the abradable outer layer.

In accordance with our invention, as shown in FIG. 2, the bond coat 1' is sprayed onto substrate 5', e.g., a compressor or turbine liner, at the highest density attainable to maximize its secondary function as an oxidation barrier at the substrate. A layer 3' of yttria stabilized zirconia is then applied to a thickness of from about 0.014-0.016 inches using equipment and parameters as disclosed in U.S. Pat. No. 4,055,705. The abradable yttria stabilized zirconia final layer 7 is then deposited to a thickness of about 0.040-0.060 inches by techniques which produce the desired density reduction. The layer of abradable material machined to the desired thickness compatible with the particular cooperating rotor stage, e.g., to about 0.018 to about 0.020 inches. The preferred density configuration has from about 20 to about 33% polyester filler in the coating. Too high density resulting from too little removable filler results in loss of abradability with wear on the rubbing rotating part such as the blade tip. Conversely, too low a density resulting from too much filler results in too soft a layer with the chance of break-up due to the high temperature and high velocity fluid streams. We have also found that no more than about 20 minutes should elapse between successive operations in producing the coatings in order to prevent oxidation in the substrate and subsequent layers.

The NiCrAlY bond coat material of layers 1 and 1' is applied by a plasma jet spray gun in powder form of $-200 +325$ mesh size, this being available commercially, e.g., from Alloy Metals Inc., Troy, Michigan. The following chemical composition is typical of such alloy:

| | |
|---|---|
| Cr | 16.2% |
| Al | 5.5% |
| Y | 0.6% |
| Ni | Balance |

As noted above, while other materials are available, we prefer to use the thermally decomposable organic filler material known as Metco 600, a polyester powder which is obtainable commercially from Metco Inc., Westbury, Long Island, N.Y., and is available in $-140 +325$ mesh size.

To ensure uniform feeding of the powders to the plasma jet spray gun, the materials are preferably dried in an oven at about 250° F. for a period required to dry the powder, e.g., a minimum of four hours. The polyester filler powder is particularly hygroscopic so that ovendrying is essential to keep the powder from "clumping."

As described, we have developed a method for forming the abradable zirconium oxide layer with a density which is acceptable for abradability. Once deposited, the substrate component which is the one of a pair of cooperating parts having relative rotating motion and is provided with the thermal barrier-abradable coating, is heated to remove the filler material and leave a porous stabilized zirconia layer which is readily abraded by the rotating component, e.g., the compressor blade tip, without wear of the tip. We have found that heating to a temperature of about 1800° F. for a period of about four hours completely removes the polyester powder leaving voids and a porous coating or layer 7 tightly adhered to the thermal barrier layer 3'. While the resulting surface of the abradable layer 7 is rough, even after machining, by reason of surface voids, good abradability was found at a rubbing speed of 750 ft/sec at 0.001 inches/sec. in-feed of the rotating blades for a depth of 0.005 inches, the ambient temperature being about 500° F. at atmospheric pressure. In addition, we have found substantially zero seal layer permeability when subjecting the seal to static pressure tests up to 50 psig.

As noted, our invention involves a method for applying a coating containing several different powders as a codeposited layer on the substrate member. The use of a plasma jet spray or flame spray technique is well known for cases in which the materials to be sprayed have similar characteristics. However, a significant difference among characteristics, e.g., melting or softening temperature and decomposition temperature, as in the case of polyester powder and zirconia, carries the potential for difficulties in obtaining satisfactory deposition of both materials simultaneously. Because $ZrO_2$ is a ceramic, its melting temperature, about 4710° F., is considerably higher than that of polyester powder having a decomposition temperature of about 1000° F.

In view of the desirability of codepositing each of the constituent powders at its preferred temperature in the same spray stream, we have found that this may be successfully accomplished by introducing the powders at different locations in the plasma stream. Although the power level of the plasma system could be identical for both powder components, the residence time and, consequently, the particle temperature of the materials would be different.

We have found it advantageous to use the Plasmadyne SG-1B spray gun which has powder feed ports located both internal and external to the gun body. Because of the peculiar requirements of the codeposited materials of the coating, this design lends itself to the use of separate powder feeders to supply both ports simultaneously. More particularly, the zirconia is introduced into the plasma stream within the gun body, the residence time and hence, the particle temperature being higher than those of the polyester powder which is introduced through the external downstream port. The significant point of our invention in this regard is that the polyester powder having the lower limiting temperature is introduced into the plasma stream downstream of the spray nozzle for the zirconia containing plasma stream.

An alternative, though less desirable, system for co-deposition of the zirconia and filler materials consists of two separate plasma spray units, each spraying one of the constituent powders at its optimum parameters. The guns would be directed so that the plasma streams merge at the coating plane or target. The need for special controls and process refinement with a system of this type is greatly increased since there is the possibility of agglomeration of the separate constituents with inadequate mixing and/or a stratification within the coating. It is apparent that a system of this type would be much more expensive than that disclosed as preferred.

An additional advantage of the processing in accordance with our invention, is that the service life of the thermal barrier abradable coatings may be significantly increased by heating the entire coating after spraying, optionally in vacuum. The effect appears to be related to sintering and the resultant densification of the bond coat 1'. The effect on the oxide layer 3' is negligible.

Because the abradable coating of our invention is applied to a component which defines the gas flow path of the turbomachine, roughness of the coating after final machining is an important consideration. Machining required to produce an aerodynamically smooth surface prior to thermal decomposition of the filler powder is accomplished. We have found that the presence of the unfilled porosity following the heating for filler decomposition does not have any adverse effect on efficiency since the resultant voids are closed cell and the porous character of the abradable coating is discontinuous.

From the foregoing description it is apparent we have provided a method for forming an abradable porous ceramic coating which is compatible with known thermal barrier coatings to produce a high temperature thermal barrier and seal coating system adapted for high temperature operation. While modifications may be apparent to those skilled in the art, such as substitution of materials and variation of process parameters, such changes are within the scope of our invention as covered by the claims which follow.

The embodiments of the invention in which an exclusive property or privilege is claimed are defined as follows:

1. A thermal barrier-fluid seal abradable coating for use in machinery having cooperating members capable of relative rotational movement and operating in a high temperature environment, at least one of said members being the coating substrate, the coating on said substrate comprising a bond layer consisting essentially of a NiCrAlY alloy covering a wear surface of said substrate, a thermal barrier layer on said bond layer consisting essentially of zirconia and a zirconia stabilizing oxide selected from the group consisting of $Y_2O_3$, MgO and CaO, and an abradable layer on said thermal barrier layer consisting essentially of porous stabilized zirconia, said porous zirconia resulting from the thermal decomposition of an organic filler material codeposited with the stabilized zirconia on said barrier layer, said abradable layer having from about 20 to about 33% voids.

2. In a turbomachine having two members capable of relative rotational movement, at least one of the members having a thermal barrier coating of the stabilized zirconia type subject to rubbing contact, and a bond layer of a NiCrAlY alloy between said thermal barrier coating and said member, the improvement comprising a porous abradable layer on said coating consisting essentially of zirconia containing an oxide from the group consisting of $Y_2O_3$, MgO and CaO, said porous abradable layer resulting from the thermal decomposition of a polyester particulate filler codeposited with said zirconia and said oxide in an amount of from about 20 to about 33% by volume to achieve the desired layer density and abradability.

3. A porous abradable layer as set forth in claim 2 wherein the thickness of said layer is from about 0.018 to about 0.020 inches.

* * * * *